Aug. 11, 1936.  F. B. YINGLING  2,050,550
HYDRAULIC COUPLING
Filed June 12, 1935   4 Sheets-Sheet 1

Inventor
FRANK B. YINGLING.
By Chas. K. Davies
Attorney

Aug. 11, 1936.  F. B. YINGLING  2,050,550
HYDRAULIC COUPLING
Filed June 12, 1935  4 Sheets—Sheet 4

Inventor
FRANK B. YINGLING.
By Chas K. Davies
Attorney

Patented Aug. 11, 1936

2,050,550

UNITED STATES PATENT OFFICE 2,050,550

HYDRAULIC COUPLING

Frank B. Yingling, Hamilton, Ohio, assignor to Cyrus J. Fitton, Hamilton, Ohio

Application June 12, 1935, Serial No. 26,313

17 Claims. (Cl. 192—12)

My present invention relates to improvements in hydraulic couplings, which while adapted for various uses, are designed especially for use with locomotives that derive power from internal combustion engines, or the Diesel type of engines; and the coupling of my invention, is utilized for the transmission of power between the engine and the change speed gearing of the locomotive, and for other power transmissions.

By the utilization of my improved hydraulic coupling device, I provide a comparatively simple, reliable, and quick-acting coupling which is interposed in the driving mechanism, and which coupling may quickly be engaged or connected for the transmission of power. With equal facility the cylinder or working space of the coupling may be evacuated, or emptied, of its motive fluid, to disconnect the coupled members, in order to facilitate the operation of the shifting levers that are manually employed to control the change speed gearing of the locomotive driving mechanism, and to facilitate accelerating of the load.

So far as I am aware, the hydraulic couplings heretofore in use are impracticable for use with the driving mechanism of a locomotive, for the reason among others, that the couplings cannot promptly or immediately be disconnected or disengaged.

In the control of existing couplings, the coupled parts are gradually released to reduce the speed of the rotary driven member and the driven shaft, before the transmission gearing of the driving mechanism could be shifted. Under these conditions of gradual release of the coupled members of the coupling, it is impracticable to accomplish a quick pick-up with sufficient power to accelerate the load of the locomotive at the different speeds of the transmission gearing, and such couplings cannot with efficiency be employed on locomotives.

By the use of my improved hydraulic coupling, the latter may with facility be quickly connected to transmit power from the engine to the transmission gearing, and with equal facility the coupled rotary parts may be disconnected, even when the engine is running at full speed, or at a lower speed, for the purpose of releasing the load and for permitting shifting of the transmission gears forming part of the driving mechanism.

In carrying out my invention I employ a driving member or rotary impeller in the nature of a motive fluid pump that is propelled by power from the engine, and a complementary runner in the nature of a turbine, together with a rotary transfer member or storage casing which may be in the nature of a valve device that is adapted to receive and transfer the motive fluid when the working chamber or vortex is evacuated or emptied, and to thereafter return the motive fluid to the working chamber for co-operation of the impeller and the runner. I also employ an exterior or outer housing for these mentioned parts, which when stopped or retarded in its rotation receives the centrifugally flowing oil and conveys this fluid to the inner storage casing, thus eliminating the centrifugal effect on the fluid. When the exterior housing is again started in its rotation through the instrumentality of a coil spring assembly and frictional contact of parts, the fluid is restored to the vortex or working space of the coupling.

In combination with the hydraulic coupling I may also employ a brake clutch, preferably of the cone type, for controlling or arresting the rotary driven parts, as the outer housing, the inner housing or storage casing, and the valve device of the coupling; and auxiliary clutch, of the multi-plate friction type, may also be combined with the hydraulic coupling, as a part thereof, for eliminating inefficiency that results from slippage between the impeller and the runner.

In further extensions and adaptations of the invention I may also employ centrifugally operated means for actuating the auxiliary friction clutch of the hydraulic coupling.

In the accompanying drawings I have illustrated several modes of physically embodying my invention in combinations and arrangements of parts, but it will be understood that various changes and alterations may be made and are contemplated in these exemplifying structures.

Figure 4:
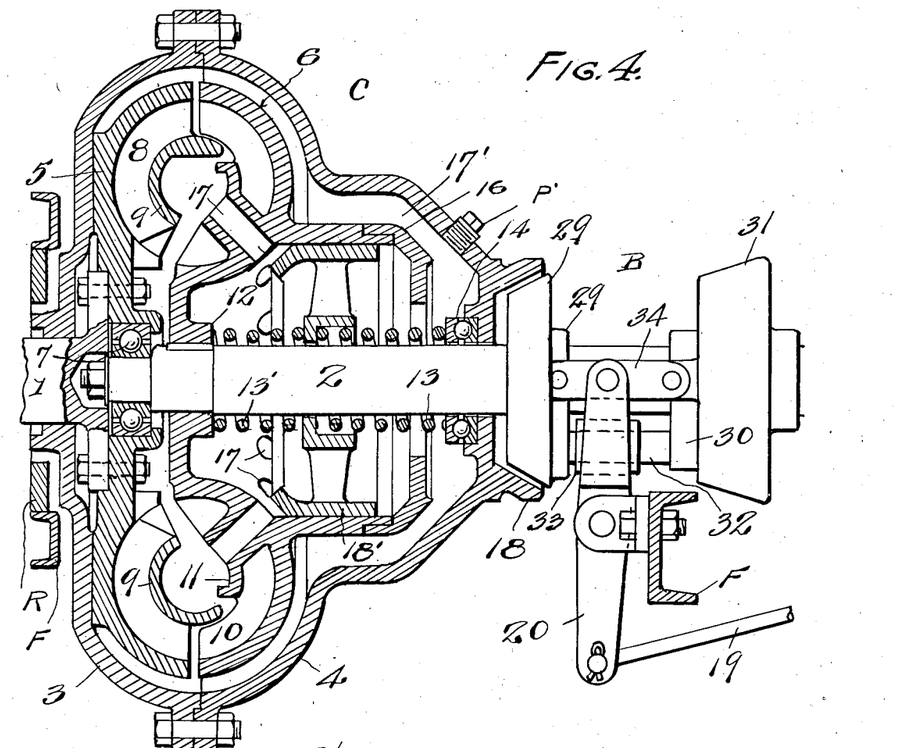
Figure 4 is a longitudinal sectional view of one form of the hydraulic coupling of my invention.
Figure 6:
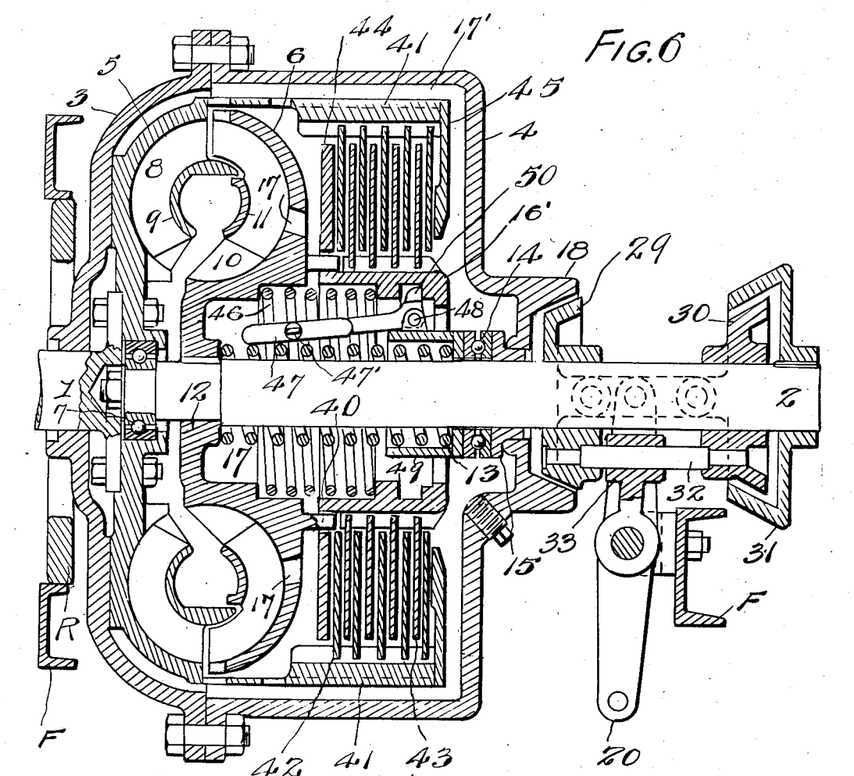
Figure 6 is a longitudinal sectional view showing a combined hydraulic coupling and auxiliary multi-plate friction clutch, together with a centrifugal control for the auxiliary clutch.
Figure 8:
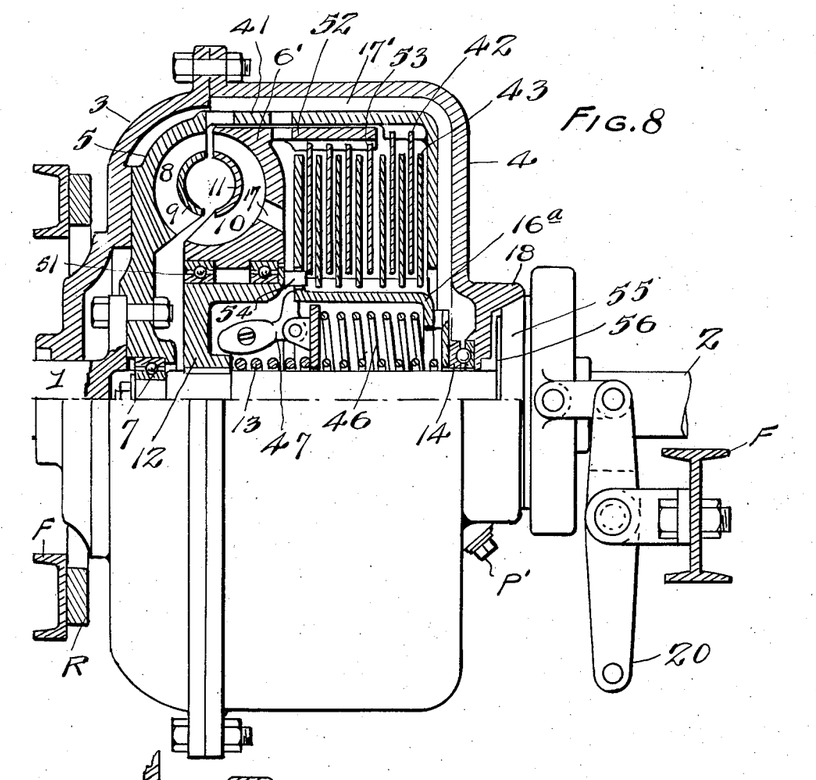
Figure 8 is a partial sectional view of the coupling of the type shown in Figure 6, but with a free-running runner, and a different type of brake clutch.

In Figures 4, 6, and 8, a longitudinally movable exterior housing 3—4 is held by spring in direct frictional contact with the impeller for rotation therewith when the impeller and the runner are coupled for transmission of power. For uncoupling the runner from the impeller the housing is shifted, and in its shifted position the housing is held, at opposite ends, by a brake and by a fixed member in frictional contact with the housing. In its shifting movements the housing performs the functions of a valve.

In all forms of the coupling illustrated, it will be understood that a longitudinally movable valve member (either the exterior housing or the interior member) is shifted for the purpose of controlling the speed of the rotary driven shaft. One shifting movement of the longitudinally movable member results in evacuation of the working chamber of the coupling and transfer of oil to a receiving reservoir within the coupling, thereby uncoupling the runner from the impeller; and a reverse shifting movement of the longitudinal member results in the restoration of oil to the working chamber thereby again coupling the runner with the impeller.

Figure 1:
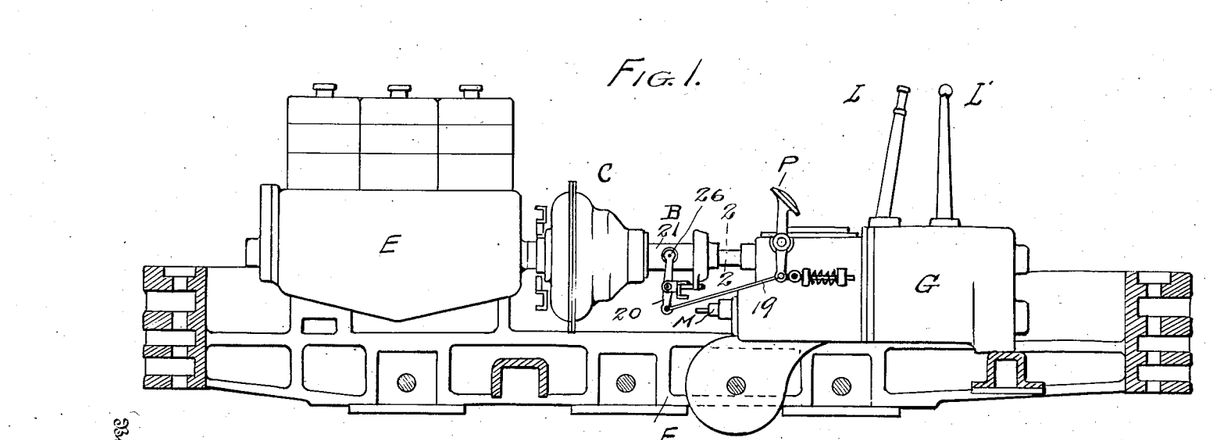
Figure 1 is an assembly view with parts in section showing a portion of a locomotive frame and a driving mechanism for the locomotive, together with one form of my hydraulic coupling located intermediate the engine or motor and the transmission gearing.

In order that the utility, general arrangement, and relation of parts of the invention may readily be understood, I have indicated in Figure 1 a locomotive frame F, with the locomotive driving mechanism in conventional form in its relative position.

The driving mechanism includes an engine E, preferably of the Diesel type, the hydraulic coupling is indicated as a whole or a unit by the letter C; the brake clutch is designated B, and the transmission gearing is located within the gear case G.

The brake clutch B, in its various forms or types illustrated, is controlled by means of the depressible pedal P, or for heavy duty the brake clutch may be controlled by motive fluid, as air, from the auxiliary indicated at M. The usual transmission gears (not shown) within the gear case G, are shifted as by the manually operated gear levers L and L'.

In all forms of the invention the motor shaft or drive shaft of the engine E is designated by the numeral 1, and the driven shaft is designated as 2, the shafts being provided with suitable journal bearings, and adapted to transmit power from the engine to the transmission gears.

The exterior housing C of the coupling is made up of two sections, bolted together, and in Figures 4, 6 and 8, these sections 3 and 4 are loosely mounted on the shafts 1 and 2 to rotate freely thereon, or to be held stationary in relation thereto. In these figures of the drawings the usual type of housing is formed outside of the drive elements with the cylindrical part of the housing enclosing the rotary impeller 5, while the housing is a part of neither the impeller nor the runner. The complementary runner for the impeller 5 is also enclosed within the housing, said runner being designated as 6 in Figures 4 and 6; and 6' in Figure 8.

In Figures 4, 6, and 8, the impeller is bolted to a flange of the drive shaft, and the impeller revolves with the drive shaft, an annular ball bearing 7 being provided between the impeller and the inner end of the driven shaft 2.

Usual and suitable vanes 8 are arranged on the impeller in an annular series, and the web, or semi-circular dished ring 9 co-operates with the vanes to form buckets in the working chamber or vortex of the coupling.

Figure 9:
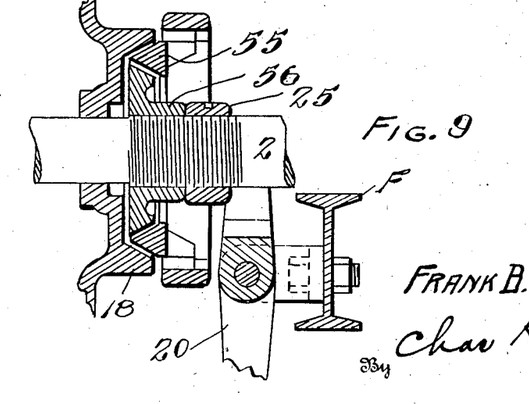
Figure 9 is a detail sectional view of the brake clutch of Figure 8.

The runners are also fashioned with complementary vanes 10 and dished rings 11, and in Figures 4, 8, and 9 the hub 12 of the runner is keyed or splined to the driven shaft 2 in such manner that the runner revolves with the shaft.

The exterior housing is movable longitudinally of the shafts so that it may be moved toward the impeller to be driven thereby, or it may be moved away from the impeller and thus freed from rotation therewith.

The housing 3—4 is retained in working relation to the impeller through the instrumentality of a spring or springs as 13, and 13', coiled about the driven shaft 2 and interposed between the hub of the runner and a thrust bearing 14, which bearing in turn is mounted on the shaft 2 against an inner flange 15 of the housing section 4.

The springs 13, 13', under tension bear against the runner at the left end and at the right bear against the thrust bearing 14, urging the housing to the right with the inner face of its left-end wall in frictional contact with a complementary face of the impeller, thereby causing the housing to revolve with the impeller.

In Figure 4 the runner is fashioned with an integral or rigid storage casing 16, which forms a reservoir for the reception of the oil or motive fluid coming from the working space or vortex of the coupling. In all of the different forms of runners illustrated, an annular series of radially disposed ports 17 affords communication between the working space or the impeller of the coupling and the reservoir or storage chamber.

An appropriate supply of motive fluid or oil is furnished to the interior of the coupling through a suitable opening, which is afterwards closed by a plug as P', and the contained oil is utilized for lubrication of the interior working parts, as well as for the motive fluid to receive power from the impeller and to transmit the power, through the runner and its hub to the driven shaft.

When the brake clutch is not in action nor affecting the outer housing, power is transmitted, through friction, from the rotary driving elements of the coupling to the exterior housing, and the latter is revolved with the coupling members.

When the engine is started, the centrifugal force created by the impeller causes the supply of oil to flow outwardly toward the peripheral working chamber or vortex between the impeller and the runner, and a circumferential movement is also imparted to the oil by the impeller, which movement is transmitted under pressure to the runner and its driven shaft.

Thus the whole coupling unit is instrumental in transmitting power from the drive shaft to the driven shaft, and, in addition, the unit performs the function of a fly wheel or balance wheel for the driving mechanism.

In Figures 4 and 6 both the exterior housing and the runner, and in Figure 8 the exterior housing and a portion of the runner, are arrested in their revolutions, or stopped, for the purpose of disconnecting or disengaging the coupling, and consequently the driven shaft is held against rotation, in order to facilitate shifting of the gears in the box G.

As the outer housing 3—4 of the coupling is disconnected from its rotary source of power, the supply of oil is promptly transferred from the working space or vortex of the coupling between the impeller and the runner, through the peripheral annular space 17' under the exterior housing, to the interior of the storage casing 16 within the housing.

The motive fluid or oil is returned to the working chamber or vortex of the coupling from the storage casing 16 through the annular series of radial ports 17 of the runner. In Fig. 4 these ports 17 are controlled by means of an annular slide valve 18', which is mounted in suitable manner to reciprocate longitudinally in the transfer or storage casing 16, and the valve member is retained by means of the springs 13 and 13' interposed between the hub of the impeller and the bearing 14 in Figure 4.

The evacuation or emptying of the working space of the coupling for the purpose of disconnecting the latter, is accomplished by depressing the pedal P of the brake clutch, which latter in Figures 4, 6, and 8, co-acts with the freely revolving exterior housing of the coupling, and also with the driven shaft, and with the runner, either directly or indirectly.

The brake member for the revolving housing may be an annular flange 18, integral with, or rigid with the section 4 of the housing.

As indicated in the drawings, various types of brake clutches may be employed, preferably of the conical type, and these are supported on a suitable member of the locomotive frame F, with the pedal P connected by link or rod 19 to the brake operating lever 20 that is pivotally supported on the frame F.

Figure 2:
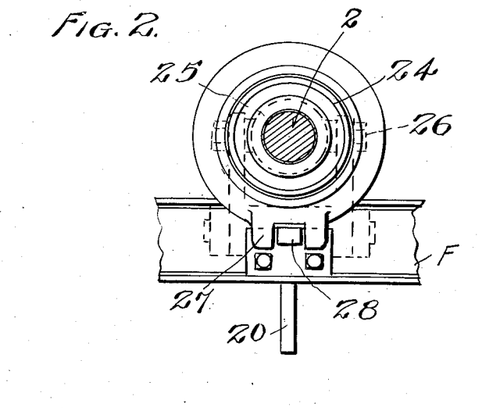
Figure 2 is a sectional detail view at line 2—2 of Figure 1 showing a portion of the brake clutch.
Figure 3:
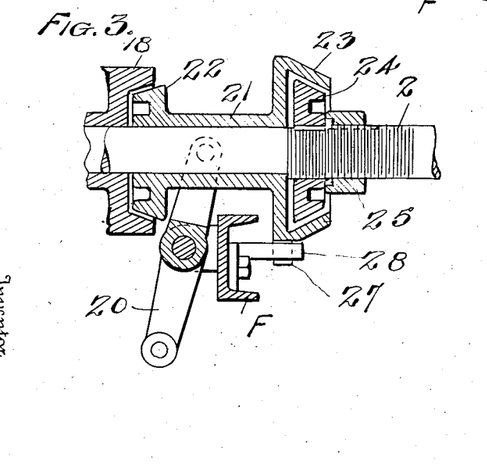
Figure 3 is a longitudinal sectional view of the brake clutch employed in Figure 1.

In the form of the brake clutch shown in Figures 1, 2, 3, a non-rotary double brake spool 21 is provided with an inner friction cone disk 22 for engagement with the brake flange 18 of the rotary control housing, and an outer friction flange 23, which frictionally engages over the inner disk 24 that is splined or keyed on the driven shaft 2. An adjusting nut 25 is threaded on a portion of the driven shaft 2, for adjusting the disk 24, which may slide on, but is rotatable with the shaft.

The brake operating lever 20 has its forked end or yoke pivoted at 26 on the spool 21, and the latter, of course, is slidable longitudinally on the driven shaft. Rotation of the brake spool and the frictionally engaged parts is prevented by use of two rigid lugs 27 spaced apart on the periphery of the flange-disk 23, and these lugs straddle a rigid bracket arm 28 that is bolted on the stationary frame member F.

Figure 5:
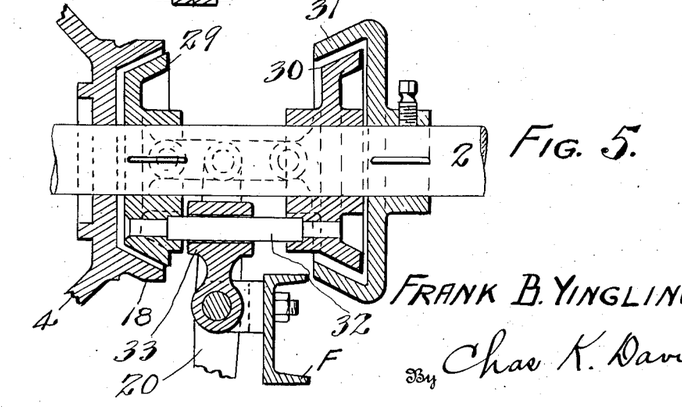
Figure 5 is a sectional detail view of the brake clutch illustrated in Figure 4.

In Figures 4, 5, and 6, the non-rotary, but longitudinally movable brake disks 29 and 30 co-act with the brake flange 18 and the flanged disk 31, respectively, the flanged disk 31 being splined on the driven shaft 2. These members 29 and 30 are prevented from turning by means of a bolt 32, which passes through a bushing 33 rigid with the brake operating lever 20, and the operating lever is connected to the two brake members 29, 30 by the linkage 34. The bolt 32 has its two ends mounted in the inner disks 29 and 30, and the bolt, together with the two sets of linkage, one at each side of the clutch, and the operating lever, prevent rotary movement of the disks 29 and 30.

Preferably the clutch members 22—18 and 29—18, which engage and arrest the rotary movement of the control housing, are thus engaged in advance relation to, or in advance of the pairs of clutch members 23—24 or 30—31 the co-action of which arrests the rotation of the driven shaft and of the runner, and these clutch parts are so adjusted to accomplish that purpose.

It will be apparent that, with the co-acting parts coupled together to transmit power from the drive shaft to the driven shaft, when the pedal P is depressed, the brake clutch is operated to arrest or stop the rotation of the control housing 3—4, and this arresting or stopping of the rotary housing is assisted by frictional contact with a stationary friction ring R that is rigidly mounted at the engine side of the coupling C, and supported on cross frame members F. By the actuation of the slidable members of the brake clutch, the rotating housing 3—4 is pushed slightly to the left free from frictional engagement with the impeller in Figures 4, 6, and 8, into frictional contact with the friction ring R, and this frictional engagement at both the engine side and the gearing side of the control housing causes an immediate arresting or stopping of the rotary movement of the housing. Thus the frictional contact employed in arresting the rotary housing is widely distributed to stabilize the housing, and to eliminate strains and stresses that would otherwise occur in the coupling.

The frictional engagement of clutch members 29 and 18 arrests the rotation of the housing and at the same time closes valve 18' against ports 17, and then the engagement of the clutch members 23—24 (or 30—31) arrests the rotation of the driven shaft and the runner; since the driving liquid or motive fluid is controlled by the rotation of the outer housing, the arresting of the housing causes the oil to be transferred through the peripheral vortex of the coupling, and through the annular space 17' to the storage casing 16 in Figure 4; to 16' in Figure 6; or to 16a in Figure 8. The oil thus evacuated and released from control of the centrifugal force developed by the impeller passes through the annular, peripheral space 17' to the storage casing or chamber.

This arresting of the outer housing, and impelled and rotating parts of the coupling, which releases the oil from the vortex of the coupling, and permits the continued and constant rotation of the drive shaft and its impeller to transfer the circulating oil to the storage casing, is due to the longitudinal movement imparted to the housing by the operation of the clutch brake against the tension of springs 13 and 13'. This longitudinal movement of parts performs the functions of a valve in the immediate release of the motive fluid, and consequent release of power in the motive fluid, and therefore the working chamber is promptly evacuated or emptied. As long as the outer housing, the driven shaft, and impelled parts are held by the brake clutch against rotation, the oil may freely circulate throughout the interior of the housing into the storage casing or chamber, without substantial pressure, and therefore without substantial power.

For the purpose of cutting off flow of oil from the storage casing or chamber through ports 17 to the working chamber after the housing is longitudinally shifted and arrested, the valve 18' is shifted to closed position with relation to the ports, by the operation of the cone-clutch or brake, in connection with spring 13. When the housing, driven shaft, runner and storage casing are arrested, the spring 13 forces the valve to the left in Figure 4 to close these ports 17, thereby causing the oil to flow from the periphery of the vortex or working chamber into the annular transfer space 17'.

If and when the brake clutch is released, and the driven parts of the coupling, together with the shaft 2 are free to revolve, the spring 13' returns the outer housing, storage casing and runner to working position with relation to the impeller, and the valve 18' opens the ports 17 to permit return of oil from the storage chamber to the working space or vortex of the coupling. The spring 13' shifts the housing from contact with friction ring F into contact with the impeller for joint rotation of the impeller and housing, and the rotation of the storage casing with the runner causes the motive fluid, under centrifugal action, to flow outwardly through the open ports 17 into the working space of the coupling, thereby causing transmission of power from the drive shaft to the driven shaft.

Thus by control of the exterior housing and the inner storage casing, the motive fluid of the hydraulic coupling is rendered operative, or inoperative, and the coupling is either engaged to engine capacity, or disengaged with the transmission of power entirely cut off. When the transmission of power is thus cut off, the change speed gearing in box G may readily be shifted by means of the levers 1 or 1'.

Thus, it will be apparent that as the exterior housing is retarded or slowed down in its rotary speed, the oil is thrown by centrifugal force of the impeller into the annular space 17' and against the inner face of the retarded, or stationary, housing, and the energy or force in the moving oil is spent in frictional contact with the wall of the housing. This spent liquid flows through space 17' into the reservoir 16, and as the valve 18' has closed ports 17, the spent liquid is collected in the reservoir. To again couple the runner with the impeller, the friction brake is released, the housing is again automatically and frictionally engaged with the rotating impeller, the valve 18' is automatically opened, and the oil, by centrifugal force is again restored to the working chamber to couple the runner with the impeller.

The actions and movements of the oil, and the functions of the operating parts, may be followed after the oil has been fed through the filling opening P' to approximately one third to one half the capacity of the interior of the coupling, and the opening plugged as indicated in Figure 4. Assuming the parts are at rest in Figure 4, the engine is started, revolving the drive shaft 1 and the impeller 5, and as the exterior housing is frictionally engaged with the impeller, the housing also revolves with the impeller. By centrifugal force, the oil is thrown from the axial center of the coupling into the working chamber between the impeller and the runner and into the annular space 17', and the impeller and runner are thus coupled together so that they revolve at approximately the same speed, and power is transmitted to the driven shaft.

To uncouple the runner from the impeller, the brake member 29 is engaged with member 18 thereby reducing the rotary speed of the casing, and if and when sufficient pressure is applied to the brake member 29, the housing is shifted longitudinally out of frictional contact with the impeller and into frictional contact with friction ring R, to stop rotation of the housing. Due to the continuing rotation of the impeller, the centrifugal force of the impeller throws the oil through the peripheral vortex of the coupling into the space 17'. The impeller is thus acting as a pump, but the oil impelled thereby is spent in its force against the inner face of the stationary exterior housing, instead of against the runner, and the oil finally collects in the interior reservoir although a portion of the oil my still idle through the working chamber. As the rotary speed of the housing is retarded its resistance to the centrifugally pumped oil increases, and when the rotary movement of the housing is stopped the centrifugal force of the oil is substantially spent against the stationary wall of the housing. The impeller thus performs the functions of a centrifugal pump to evacuate the working chamber of the coupling and transfer the oil to the interior reservoir.

It will be understood that the transfer valve-casing 38, which is revolved by frictional contact with the impeller 3', is longitudinally shifted, in lieu of the exterior housing, for the purpose of evacuating the working chamber of the coupling, and as the valve 18a is simultaneously closed, the oil which is forced from the working chamber by the impeller acting as a centrifugal pump, collects at the axial center of the coupling. Under these conditions, the spent oil has been de-energized of its centrifugal force by frictional contact with the inner face of the wall of the transfer valve member or casing 38.

In Figure 6, where the exterior housing is to be shifted laterally of the impeller 5 and the runner 6, the storage casing 16' is also laterally movable with relation to the runner, but the storage casing revolves with the runner, and an automatically operated, auxiliary, multiple-plate friction clutch is combined, with the storage casing and the impeller, and located within the exterior housing of the coupling.

As is well known to those skilled in this art, the runner, under ordinary conditions, revolves at less speed than the impeller of hydraulic couplings now in use, causing a slippage between the impeller and the runner. Due to the combined action of the hydraulic coupling and my auxiliary friction clutch, the usual loss of speed and energy caused by this slippage is materially decreased or entirely eliminated.

In the formation of the auxiliary friction clutch, the storage casing 16' is related to the runner 6 in such manner that the former revolves with the latter but is laterally movable toward and from the runner, suitable means, as clutch pins 40 on the runner engaging complementary sockets of the storage casing, to permit this movement. The impeller 5, at its periphery is fashioned with a laterally extending flange or support 41 for the thin metal friction plates 42, and these plates 42 alternate with the complementary plates 43 mounted in usual manner, on the exterior periphery of the cylindrical storage casing 16', the two series of alternate plates being interposed intermediate of a presser plate 44 rigid with the storage casing 16', and a complementary, back plate 45 rigid with the impeller. It will be seen that the presser plate 44 is related to the ports 17 of the runner in such manner as to close these ports while the control housing 3—4 is held arrested.

Figure 7:
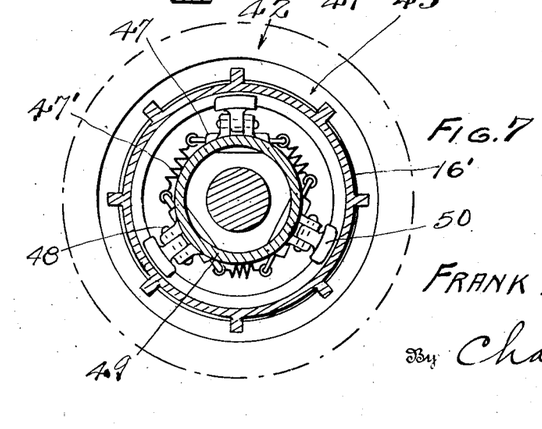
Figure 7 is a detail assembly of the centrifugal for the auxiliary clutch of Figure 6.

The automatically engaged, auxiliary, friction clutch is closed when the coupling is engaged and revolving, by means of a spring 46 interposed between the runner and the storage casing, and in addition I may employ a plurality of centrifugal actuated, weighted levers 47 which operate to engage the friction clutch when the coupling is connected and transmitting power. The number of these levers may be varied from the three indicated, but the adjoining levers of the series that is arranged within the storage casing are connected as by a spring 47' shown in Figure 7. These levers are pivoted at 48 on a ring 49 surrounding the driven shaft, and the arms 50 of the levers frictionally engage or bear against a wall of the storage casing, thereby urging the latter to move laterally from the runner to frictionally engage the plates of the friction clutch between the presser plate 44 and the back plate 45.

The exterior housing 3—4, which may be shifted laterally of the impeller and runner, is resiliently held to operative position against, or in frictional contact with the outer face of the impeller 5 by the action of the spring 13. Thus, the revolving housing 3—4 is arrested by means of the non-rotary brake disk 29 at one end and the friction ring R at the other end of the housing; and the driven shaft with its runner 6 and the storage casing 16' are arrested in their rotary movement by co-action of the non-rotary cone 30 and the cone disk 31 keyed to the shaft 2.

As the brake member 29 is shifted to disengage the exterior housing from frictional engagement with the impeller, the thrust bearing 14 is also shifted to move the casing 16' against tension of spring 13 which has greater tensile strength than spring 46. The plate 44 which is attached to the transfer casing moves with the latter to close the ports 17.

Inasmuch as the inner reservoir or transfer casing moves with the exterior housing, and revolves with the housing, and the housing revolves with the impeller, therefore, when the runner is coupled to revolve with the impeller and as the speed of the runner is accelerated, the weights 47 clamp the friction plate 44 against the plates of the friction clutch, as an auxiliary drive between the impeller and the runner.

When these braking elements of the brake clutch are applied by use of the pedal P, the presser plate 44 moves to close the ports 17, the rotation of the exterior housing, runner, and storage casing is arrested, and, with the impeller still revolving, the working chamber or vortex of the coupling is evacuated through the peripheral space between the impeller and the runner against the stationary, or now non-rotary outer housing. The released oil flows centrifugally from the working space or vortex into the annular space 17' and thence into the interior of the storage casing, to be afterward returned to the working space and outer housing when the brake clutch is released.

The longitudinal shifting of the exterior housing 3—4 results in a flow of the oil the same as in Figure 4. By the use of the friction clutch, plates 42 and 43, within the housing, I substantially eliminate loss of transmitted power that would otherwise occur due to slippage between the impeller and the runner, by locking together the impeller and the runner after the transmitted speed has appoximated its maximum efficiency.

In the modified form of the combined hydraulic coupling and friction clutch of Figure 8, the runner 6' is free to revolve on journal or ball bearings 51 surrounding the runner-hub 12 when the auxiliary friction clutch is disengaged, but the runner is clutched or frictionally connected with the impeller 5, and with the storage casing 16a so that these parts may revolve together. Thus the runner 6' is fashioned with laterally extending supports 52 for the friction plates 53, and this series of plates 53 co-acts with the other two series 42 and 43 of the impeller and transfer or storage casing, respectively, to form the auxiliary friction clutch. In this instance the runner hub 12 which is keyed on the driven shaft 2, is clutched at 54 with the storage casing, similar to the coupling 40 in Figure 6.

The longitudinal shifting of the exterior housing 3—4 results in a flow of oil the same as in Figures 4 and 6, the runner however, is controlled by the use of the interior friction clutch within the housing, instead of being directly connected with the driven shaft as in Figure 6. In some instances, this construction has the advantage of more promptly stopping the rotation of the driven shaft 2 through disengagement of the friction clutch.

In Figure 9, the compactly arranged brake clutch of Figure 9 has a non-rotary friction wedge-ring 55 that co-acts with both the flange 18 of the exterior housing and with the brake disk 56 that is threaded on the driven shaft, and the brake clutch is engaged by operation of the clutch lever 20, the starting and stopping operations being the same as in the construction of Figure 6.

The transfer valve casing 38a is held in frictional contact with the impeller-housing 3' by the spring 39 and the valve member revolves with the impeller, the runner being coupled with the transfer casing through the interior friction clutch. When the transfer casing is shifted, the centrifugal force of the oil pumped by the impeller is spent against the walls of the casing 38a, and the spent oil is collected at the axial center of the coupling.

In Figures 4, 6, and 8, the starting, and the arresting of the driven shaft 2, and control of speed in the transmission of power through the coupling, is accomplished by control of the exterior housing of the coupling, through the instrumentality of the brake clutch, the exterior housing and the storage casing performing the functions of a valve to release the power from the motive fluid or oil in the working space or vortex of the coupling, when the rotation of the exterior housing is arrested.

By the combined use of the auxiliary friction clutch in Figures 6 and 8, with the hydraulic coupling, the efficiency of the coupling in its transmission of power is materially enhanced. The auxiliary friction clutch not only relieves part of the load imposed by the driving shaft on the hydraulic coupling, but, in addition, the friction clutch also relieves the hydraulic clutch or coupling of part of the load being transmitted to the driven shaft, and the engine power is transmitted without substantial loss of energy, and without slippage.

The operating friction clutch also assists in, and facilitates, the arresting or stopping of the driven shaft in a minimum period of time, by its influence on the exterior housing of the coupling, thereby slowing down the impelled parts, and entirely cutting off the transmission of power to the driven shaft.

Having thus fully described my invention, what I claim as new and desire to secure by Letters Patent is:—

1. In a hydraulic coupling, the combination with a drive shaft and an impeller, and a driven shaft and runner, of an exterior housing longitudinally movable and rotatable on said shafts, and means at opposite ends of the housing for frictional engagement therewith to arrest rotation of the housing for control of transmission of power through the coupling.

2. In a hydraulic coupling, the combination with a drive shaft and an impeller, and a driven shaft and runner, of a longitudinally movable, rotatable, exterior housing and resilient means for retaining the housing and impeller in operative relation, and means for arresting the rotation of the housing to control transmission of power through the coupling.

3. In a hydraulic coupling, the combination with a drive shaft and an impeller, and a driven shaft and runner, of a longitudinally movable, rotatable, exterior housing and resilient means for retaining the housing and impeller in operative relation, and means at opposite ends of the housing for frictional engagemengt therewith to arrest rotation of the housing for control of transmission of power through the coupling.

4. In a hydraulic coupling, the combination with a drive shaft and an impeller, and a driven shaft and runner, of a longitudinally movable, rotatable, exterior housing and resilient means for retaining the housing and impeller in operative relation, a stationary friction ring for frictional co-action with one end of the housing, a non-rotary longitudinally movable brake device, and a complementary brake device on the other end of the housing, and means for engaging said friction members to arrest the rotation of the housing.

5. In a hydraulic coupling, the combination with a drive shaft and an impeller, and a driven shaft and runner, of an exterior housing rotatable on said shafts, a brake member on the driven shaft and a complementary member on the housing, a non-rotary brake member for co-action with the first two brake members, and means for frictionally engaging said members.

6. In a hydraulic coupling, the combination with a drive shaft and an impeller, and a driven shaft and runner, of an exterior housing rotatable on said shafts, a non-rotary longitudinally movable brake device and a complementary brake device on the housing, and means for operating the brake device for arresting rotation of the housing to control transmission of power through the coupling.

7. In a hydraulic coupling, the combination with a drive shaft and an impeller, a driven shaft and a runner rotatable therewith, of an exterior housing, a thrust bearing in the housing, a spring interposed between said bearing and runner to retain the housing in operative relation with the impeller, a brake member on the housing, a complementary non-rotary brake member mounted concentrically of the driven shaft, and means for engaging said brake members.

8. In a hydraulic coupling, the combination with a drive shaft and an impeller, a driven shaft and a runner rotatable therewith, of an exterior longitudinally movable exterior housing loosely mounted on said shafts, a stationary friction member for co-action with one end of the housing, a brake flange rigid with the other end of the housing, a non-rotary brake disk for engagement with the brake flange, and means for operating said disk.

9. In a hydraulic coupling the combination with a drive shaft and impeller, a driven shaft and a runner rotatable therewith, of an exterior housing having a brake flange at one end, a stationary friction member for co-action with the other end of the housing, a side thrust bearing in the housing, a spring interposed between the bearing and the runner to hold the housing and impeller in operative relation, a non-rotary brake member mounted concentrically of the driven shaft, and means for engaging said brake member with the brake flange.

10. In a hydraulic coupling, the combination with a drive shaft and impeller, a driven shaft and a runner rotatable therewith, of an exterior housing having a brake flange, a side thrust bearing in the housing and a spring interposed between said bearing and the runner, a brake disk rotatable with the driven shaft, a non-rotary brake member for engagement with said brake disk, and means for operating said non-rotary brake member.

11. In a hydraulic coupling, the combination with a drive shaft and impeller, and a driven shaft and runner, of an exterior housing rotatable with and longitudinally movable on the driven shaft, a storage casing rotatable with the runner, means within the housing affording communication from the working space of the coupling to said storage casing, automatically controlled means for controlling said communication, and means for arresting the rotation of the housing.

12. In a hydraulic coupling, the combination with a drive shaft and impeller, and a driven shaft and runner, of an exterior housing rotatable with and longitudinally movable of the driven shaft, a spring between the housing and the runner for retaining the impeller and housing in operative relation, a storage casing rotatable with the runner and communicating with the working space of the coupling, means automatically controlling such communication, and means operable when the housing is longitudinally shifted for arresting its rotation.

13. In a hydraulic coupling, the combination with a drive shaft and impeller, and a driven shaft and runner, of an exterior housing rotatable on said shafts, an auxiliary friction clutch interposed between the impelling and the impelled parts of the coupling, automatically operating means for controlling said clutch, and means for arresting the rotation of the housing.

14. In a hydraulic coupling, the combination with a drive shaft and impeller, and a driven shaft and runner, of an exterior housing rotatable on said shafts and providing an annular transfer space, a storage casing within said space and rotatable with the runner, a series of ports between the working space of the coupling and said storage casing, an automatically operated valve member controlling said ports, and means for arresting the rotation of the housing.

15. In a hydraulic coupling, the combination with a drive shaft and impeller, a driven shaft and runner, and a storage casing rotatable with and movable laterally of the runner, of an exterior housing mounted on said shafts, a friction clutch interposed between the impeller and said storage casing, said storage casing forming a transfer surface, automatically operating means for controlling said clutch, and means for arresting the rotation of the housing.

16. In a hydraulic coupling, the combination with a drive shaft and an impeller, a driven shaft, a runner-hub rotatable with the driven shaft, and a free-running runner mounted on said hub, a storage casing rotatable with the runner hub adapted to communicate with the working space of the coupling, and means for controlling said communication, an auxiliary friction clutch having co-acting parts mounted on said impeller and casing, an exterior housing, and means for arresting rotation of the housing.

17. In a hydraulic coupling, the combination with a drive shaft and an impeller, and a driven shaft and runner, of an exterior housing rotatable on and movable longitudinally of said shafts, and means for shifting the housing for controlling transmission of power from the impeller to the runner.

FRANK B. YINGLING.